United States Patent [19]

Portugall et al.

[11] Patent Number: 4,751,128
[45] Date of Patent: Jun. 14, 1988

[54] FULLY AROMATIC THERMOTROPIC POLYESTERS

[75] Inventors: Michael Portugall, Wachenheim; Bernd Hisgen, Limburgerhof; Hans-Jakob Kock; Erhard Seiler, both of Ludwigshafen; Gerd Blinne, Bobenheim, all of Fed. Rep. of Germany

[73] Assignee: BASF Aktiengesellschaft, Ludwigshafen, Fed. Rep. of Germany

[21] Appl. No.: 79,995

[22] Filed: Jul. 31, 1987

[30] Foreign Application Priority Data

Aug. 28, 1986 [DE] Fed. Rep. of Germany ....... 3629211

[51] Int. Cl.$^4$ .................. C08G 63/02; C08G 63/18
[52] U.S. Cl. ........................ 528/193; 528/194; 528/176
[58] Field of Search .............. 528/191, 193, 194, 176

[56] References Cited

U.S. PATENT DOCUMENTS

| | | | |
|---|---|---|---|
| 4,156,070 | 5/1979 | Jackson et al. | 528/191 |
| 4,412,058 | 10/1983 | Siemionko | 528/191 |
| 4,447,593 | 5/1984 | Funakoshi et al. | 528/176 |
| 4,499,259 | 2/1985 | Irwin | 528/190 |
| 4,564,669 | 1/1986 | Dicke et al. | 528/173 |
| 4,614,789 | 9/1986 | Dicke et al. | 528/128 |
| 4,664,972 | 5/1987 | Connolly | 528/176 X |

Primary Examiner—Lucille M. Phynes
Attorney, Agent, or Firm—Oblon, Fisher, Spivak, McClelland & Maier

[57] ABSTRACT

Fully aromatic themotropic polyesters are based on
(A) from 30 to 60 mol % of 4-hydroxybenzoic acid,
(B) from 20 to 35 mol % of a mixture of
 (B$_1$) terephthalic acid and
 (B$_2$) isophthalic acid,
 the molar ratio of B$_1$ to B$_2$ being from 1.04:1 to 19:1, and
(C) from 20 to 35 mol % of a mixture of
 (C$_1$) hydroquinone,
 (C$_2$) 4,4'-dihydroxydiphenyl and
 (C$_3$) from 0 to 5 mol % of a dihydroxy compound of the general formula I

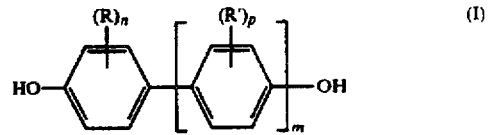

where R and R' are each C$_1$–C$_4$-alkyl, halogen or aryl, n is 1, 2 or 3 and m is 0 or 1,
the molar ratio of C$_1$ to C$_2$ being from 0.1:1 to 2.67:1 and the molar ratio of B to C being from 0.9:1 to 1.1:1.

9 Claims, No Drawings

FULLY AROMATIC THERMOTROPIC POLYESTERS

The present invention relates to fully aromatic thermotropic polyesters based on
(A) from 30 to 60 mol % of 4-hydroxybenzoic acid,
(B) from 20 to 35 mol % of a mixture of
 (B$_1$) terephthalic acid and
 (B$_2$) isophthalic acid,
 the molar ratio of B$_1$ to B$_2$ being from 1.04:1 to 19:1, and
(C) from 20 to 35 mol % of a mixture of
 (C$_1$) hydroquinone,
 (C$_2$) 4,4'-dihydroxydiphenyl and
 (C$_3$) from 0 to 5 mol % of a dihydroxy compound of the general formula I

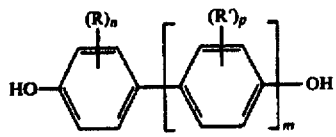

where R and R' are each alkyl of 1 to 4 carbon atoms, halogen or aryl, n and p are each 1, 2 or 3 and m is 0 or 1,
the molar ratio of C$_1$ to C$_2$ being from 0.1:1 to 2.67:1 and the molar ratio of B to C being from 0.9:1 to 1.1:1. The sum of components A, B and C is always 100 mol %.

The present invention furthermore relates to a process for the preparation of such polyesters and their use for the production of fibers, films and moldings.

The term thermotropic is used very generally to describe substances which form liquid crystalline melts, i.e. melts having anisotropic properties.

Thermotropic aromatic polyesters obtained from aromatic dicarboxylic acids and dihydroxy compounds, with or without aromatic hydroxycarboxylic acids, are known and are described in, for example GB-A-2 061 304, DE-A-20 25 971, EP-A-33 147 and EP-A-92 843. The disadvantage of these known systems is that they have to be prepared by a complicated and time-consuming multistage process. Furthermore, the products generally have melting points above 350° C., which makes processing by a thermoplastic process substantially more difficult.

DE-A-35 17 587 describes thermoplastic molding materials which contain, in addition to a basic resin of an oxybenzoyl copolyester, a fairly small amount of a polymeric flow modifier obtained from terephthalic acid, isophthalic acid, 4-hydroxybenzoic acid, hydroquinone and 4,4'-dihydroxydiphenyl. The description states that hydroquinone is used as a starting material only when isophthalic acid is the only acid component present. The flow modifiers described in the Examples have very high melting points (Example 3: higher than 400° C.) or do not have a crystalline melting point, i.e. possess only poor heat distortion resistance.

It is an object of the present invention to provide fully aromatic thermotropic polyesters which, in comparison with the flow modifiers described in DE-A-35 17 587, can be more readily processed by a thermoplastic method and at the same time have improved heat distortion resistance.

We have found that this object is achieved, according to the invention, by the fully aromatic thermotropic polyesters defined at the outset.

The novel fully aromatic polyesters are composed of units derived from 4-hydroxybenzoic acid (A), terephthalic acid (B$_1$), isophthalic acid (B$_2$), hydroquinone (C$_1$) and 4,4'-dihydroxydiphenyl (C$_2$).

The amount of 4-hydroxybenzoic acid (component A) is from 30 to 60, in particular from 35 to 55, mol %.

The mixtures of terephthalic acid and isophthalic acid (component B) are used in an amount of from 20 to 35, preferably from 22.5 to 32.5, mol %. The same also applies to the amount of the mixture of the dihydroxy compounds (component C).

The molar ratio of components B to C is from 0.9:1 to 1.1:1, preferably from 0.95:1 to 1.05:1; particularly advantageously, equimolar amounts of components B and C are used.

The molar ratio of components B$_1$ to B$_2$, ie. of terephthalic acid to isophthalic acid, is from 1.04:1 to 19:1, preferably from 1.5:1 to 9:1.

The molar ratio of hydroquinone (C$_1$) to 4,4'-dihydroxydiphenyl (C$_2$) is from 0.1:1 to 2.67:1, preferably from 0.5:1 to 2.33:1.

From 0 to 5 mol % of an aromatic dihydroxy compound of the general formula I

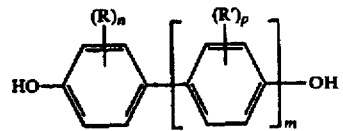

where R and R' are each alkyl of 1 to 4 carbon atoms, halogen or aryl, n and p are each 1, 2 or 3 and m is 0 or 1, may also be present in the monomer mixture.

R and R' in the general formula (I) may be identical or different, and furthermore several different substituents may be present on the same aromatic ring.

Where m in the general formula (I) is 0, n is preferably 1, 2 or 3, whereas when m is 1, n and p are each preferably 1 or 2.

R and R' are each preferably methyl, tert-butyl or phenyl. Preferred compounds of the general formula (I) are the following compounds:

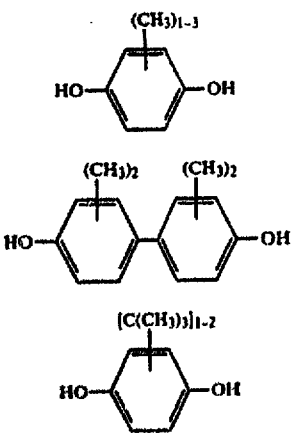

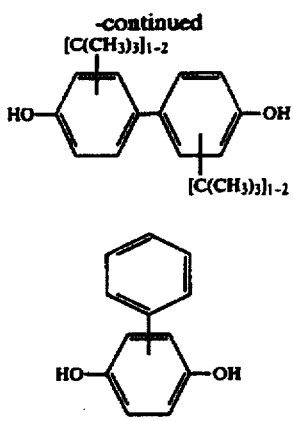

Particularly preferred compounds are those in which R and R' are identical.

The hydroxy compounds of the general formula (I) are known per se and are described in the literature. The presence of the dihydroxy compounds $C_3$ is not obligatory but has proven advantageous in some cases. Preferably from 0.5 to 5, in particular from 1 to 4, mol % of component $C_3$ are used.

The thermotropic, i.e. liquid crystalline, state of the novel fully aromatic polyesters can be demonstrated by the method described in German Laid-Open Application DOS No. 2,520,819, for example using a polarization microscope. Between crossed polarizers, the polymer melts, applied in a 10 μm thick layer between glass plates, have textures which may be assigned to a mesomorphic phase. It is surprising that, compared with the flow modifiers described in DE-A-35 17 587, the novel polyesters have substantially improved properties with regard to processability and heat distortion resistance. This is achieved by using mixtures of isophthalic acid and terephthalic acid as the dicarboxylic acid component and mixtures of hydroquinone, 4,4'-dihydroxydiphenyl and, if necessary, a dihydroxy compound of the general formula (I) as the dihydroxy component.

The melting point of the polyesters is, as a rule, from 280° to 350° C., in particular from 300° to 350° C..

The heat distortion point, determined according to ISO/R75, method A, is in general higher than 180° C., in particular higher than 200° C.

The shear modulus, determined according to DIN 53,445, at 200° C., is in general not less than 25%, in particular not less than 30%, of the value measured at 0° C. under otherwise identical conditions.

The relative viscosity of the novel fully aromatic polyesters, determined in 0.1% strength by weight solution in pentafluorophenol at 60° C., is preferably from 1 to 4, in particular from 1.5 to 3.5, dl/g.

The novel thermotropic polyesters can be prepared in principle by a conventional process, as described in, for example, U.S. Pat. Nos. 4,375,530 and 4,118,372.

In an advantageously used process, the starting materials A, $B_1$, $B_2$, $C_1$, $C_2$ and, where relevant, $C_3$ are subjected to single-stage polycondensation in the melt, in the presence of a 5–60% molar excess of an anhydride of an alkanecarboxylic acid of 2 to 6 carbon atoms. The molar excess of anhydride is based on the total content of OH groups in the monomer mixture.

Among the anhydrides of the alkanecarboxylic acids of 2 to 6 carbon atoms, acetic anhydride, propionic anhydride and butyric anhydride are preferred, acetic anhydride being very particularly preferred. The molar excess of anhydride is preferably from 10 to 50 mol %.

It has also proven advantageous to carry out the reaction under an inert gas atmosphere, for example nitrogen or argon.

It is sometimes advantageous to accelerate the reaction by using catalysts, for example those described in EP-A-131 846. In this case, the amount of these catalysts is from 0.001 to 1% by weight, based on the total amount of monomers used.

A particularly preferred embodiment of this process is described below.

The monomers A, $B_1$, $B_2$, $C_1$, $C_2$ and, where relevant, $C_3$ and the carboxylic anhydride are mixed under an inert gas atmosphere, and the stirred mixture is refluxed. During this procedure, it is advantageous to increase the temperature stepwise by maintaining a temperature of from 130° to 200° C. for up to 5, preferably up to 2, hours and then increasing the temperature to 250°–370°C., preferably in the course of from 2 to 2.5 hours. Excess carboxylic anhydride and carboxylic acids formed are distilled off in the course of the reaction.

In order to obtain as quantitative a conversion as possible, it is advantageous to carry out the last phase of the reaction under reduced pressure, preferably from 0.1 to 200 mbar (from 10 to 20,000 Pa).

The resulting fully aromatic polyesters can then be subjected to postcondensation in the solid phase. This is preferably carried out at from 200° to 300° C., preferably from 200° to 280° C. It is also possible to effect the postcondensation in the solid phase after processing by a thermoplastic method.

The condensation in the solid phase is advantageously carried out under an inert gas atmosphere, for example under nitrogen or argon.

In the process described above, fully aromatic polyesters having advantageous properties are obtained in a single stage in a relatively short time.

Conventional additives and processing assistants may be added to the novel fully aromatic polyesters. These additives and assistants include oxidation stabilizers, heat stabilizers, UV stabilizers, lubricants, mold release agents, dyes and pigments, fibrous and powdered fillers and reinforcing agents, nucleating agents and plasticizers. Such additives are known per se and are described in the literature.

Examples of oxidation stabilizers and heat stabilizers include halides of metals of group I of the Periodic Table, if necessary as a mixture with copper(I) halides or sterically hindered phenols in concentrations of up to 1% by weight.

Suitable UV stabilizers are substituted resorcinols, salicylates, benzotriazoles, benzophenones and mixtures of these, which are generally added in amounts of up to 2% by weight.

Dyes and pigments are used in general in amounts of up to 5% by weight. Examples are nigrosine, titanium dioxide, cadmium sulfide, phthalocyanine dyes, ultramarine blue and carbon black.

Examples of fillers and reinforcing agents are carbon fibers, glass fibers, amorphous silica, calcium silicate, aluminum silicate, magnesium carbonate, kaolin, chalk, powdered quartz, mica and feldspar, which may amount to up to 70% by weight, based on the total weight of the filled material.

Examples of nucleating agents are talc, calcium fluoride, sodium phenylphosphinate, alumina and finely divided polytetrafluoroethylene.

Up to 20% by weight of plasticizers, such as phthalates, hydrocarbon oils and sulfonamides, may also be used.

The novel fully aromatic polyesters have excellent heat distortion resistance and a smooth, glossy and abrasion-resistant surface coupled with a pale natural color. Furthermore, they are substantially resistant to chemicals and flame-retardant and, for polyesters, possess excellent stability to hydrolysis.

Moldings produced from the novel fully aromatic polyesters have excellent mechanical properties, in particular rigidity, strength and toughness. The said polyesters are therefore particularly useful for the production of moldings for the electrical industry, electronic computing and accounting machines, automotive construction and other industrial areas.

Moreover, the novel polyesters can be used to produce fibers and films having a good property spectrum.

The polyesters according to the invention can as a rule be processed at below 370° C. by injection molding, pressing or extrusion.

EXAMPLE 1

The novel polyester was prepared using the following components:
4.5 moles (42.86 mol %) of 4-hydroxybenzoic acid,
2.4 moles (22.85 mol %) of terephthalic acid,
0.6 mole (5.71 mol %) of isophthalic acid,
1.8 mole (17.15 mol %) of hydroquinone and
1.2 moles (11.43 mol %) of 4,4'-dihydroxydiphenyl.

These components were initially taken under nitrogen in a 5 l reaction kettle, together with 1,360 ml (14.4 moles) of acetic anhydride. The stirred mixture was heated to 150° C. in the course of 30 minutes and then to an external temperature of 345° C. in the course of 170 minutes. Thereafter, the pressure was reduced to 560 mbar, and subsequently, in each case in the course of 10 minutes, to half the previous value. The external temperature was increased to 360° C. during this procedure.

The final pressure was 35 mbar after a total reaction time of 240 minutes.

The intrinsic viscosity of the resulting polyester was 3.3 dl/g, measured in 0.1% strength by weight solution in pentafluorophenol at 60° C.

The polyester gave a film-forming mesomorphic melt.

DSC measurements (differential scanning calorimetry) indicated a melting point of 340° C..

The polymer could be processed without difficulty at 360° C. by injection molding.

The heat distortion point according to ISO/R75 was 248° C. by method A and higher than 250° C. by method B.

The shear modulus according to DIN 53,445 at 200° C. was still 48% of the value measured at 20° C. under otherwise identical conditions.

EXAMPLE 2

The following components were used:
4.5 moles (42.86 mol %) of 4-hydroxybenzoic acid,
2.1 moles (20 mol %) of terephthalic acid,
0.9 mole (8.58 mol %) of isophthalic acid,
1.5 moles (14.28 mol %) of hydroquinone and
1.5 moles (14.28 mol %) of 4,4'-dihydroxydiphenyl.

The starting compounds were mixed with 1,326 ml (14.07 moles) of acetic anhydride and reacted as described in Example 1.

The final temperature was 350° C. and the final pressure 70 mbar.

The intrinsic viscosity was measured as 2.7 dl/g, determined as in Example 1.

The melting point (from DSC measurements) was 15° C..

The polymer could be processed without difficulty at 340° C. by injection molding; the heat distortion point according to ISO/R75 was 248° C. by method A and higher than 250° C. by method B.

The shear modulus according to DIN 53,445, at 00° C., was still 51% of the value measured at 20° C. under otherwise identical conditions.

EXAMPLE 3

The following starting compounds were used:
4.5 moles (42.86 mol %) of 4-hydroxybenzoic acid,
2.7 moles (25.71 mol %) of terephthalic acid,
0.3 mole (2.86 mol %) of isophthalic acid,
1.5 moles (14.28 mol %) of hydroquinone,
1.2 moles (11.43 mol %) of 4,4'-dihydroxydiphenyl and
0.3 mole (2.86 mol %) of methylhydroquinone.

The starting components were reacted with 1,360 ml (14.4 moles) of acetic anhydride as described in Example 1.

The intrinsic viscosity of the resulting product, determined as in Example 1, was 2.08 dl/g, the melting point from DSC measurements was 345° C., and the shear modulus according to DIN 53,445, at 200° C., was still 45% of the value determined at 20° C..

The polymer could be processed without difficulty at 360° C. by injection molding.

EXAMPLE 4

The procedure described in Example 3 was followed, except that methylhydroquinone was replaced by tert-butylhydroquinone.

The intrinsic viscosity of the resulting product was 2.14 dl/g, the melting point from DSC measurements was 335° C., and the shear modulus according to DIN 53,445, at 200° C., was still 40% of the value measured at 20° C..

The polymer could be processed without difficulty at 350° C. by injection molding.

EXAMPLE 5

The following components were used:
4.5 moles (42.86 mol %) of 4-hydroxybenzoic acid,
2.4 moles (22.86 mol %) of terephthalic acid,
0.6 mole (5.71 mol %) of isophthalic acid,
1.2 moles (11.43 mol %) of hydroquinone,
1.5 moles (14.28 mol %) of 4,4'-dihydroxydiphenyl and
0.3 mole (2.86 mol %) of methylhydroquinone.

These starting materials were reacted with 1,360 ml of acetic anhydride as described in Example 1, the only difference being that the final temperature was 350° C. and the final pressure 50 mbar.

The intrinsic viscosity of the resulting product was 1.15 dl/g, the melting point was 320° C., and the shear modulus at 200° C. was still 35% of the value measured at 20° C..

The polymer could be processed without difficulty at 350° C. by injection molding.

EXAMPLE 6

The procedure described in Example 5 was followed, except that methylhydroquinone was replaced by trimethylhydroquinone.

The final temperature after the reaction was 350° C. and the final pressure 100 mbar.

The intrinsic viscosity was 2.54 dl/g, the melting point from DSC measurements was determined as 320° C., and the shear modulus according to DIN 53,445, at 200° C., was still 31% of the value at 20° C.

COMPARATIVE EXAMPLE 1

(Example 3 from German Laid-Open Application DOS No. 3,517,287)

The following components were used:
0.306 mole (49.92 mol %) of 4-hydroxybenzoic acid,
0.134 mole (21.86 mol %) of terephthalic acid,
0.019 mole (3.10 mol %) of isophthalic acid and
0.154 mole (25.12 mol %) of 4,4'-dihydroxydiphenyl.

The components were reacted with 67.4 ml of acetic anhydride as described in Example 1.

The final external temperature was 360° C., and the final pressure 8 mbar.

In contrast to Examples 1 to 6, in which a filament-forming mesomorphic melt was obtained after the reaction, the reaction product in this case was solid and had a grayish yellow color.

The polymer could not be melted below 400° C. and was insoluble in pentafluorophenol, so that it was also impossible to determine the relative viscosity.

A product having the same composition and prepared by the process in DE-A-35 17 587 (Example 3) was likewise infusible below 400° C. and thus could not be processed by a thermoplastic method below this temperature.

COMPARATIVE EXAMPLE 2

(Example 4 from DE-A-35 17 587)

The following components were used:
0.37 mole (64.92 mol %) of 4-hydroxybenzoic acid,
0.1 mole (17.54 mol %) of isophthalic acid and
0.1 mole (17.54 mol %) of 4,4'-dihydroxydiphenyl.

The components were reacted with 62 ml of acetic anhydride as described in Example 1.

The final temperature in this case was 330° C. and the final pressure 53 mbar.

The intrinsic viscosity of the resulting product was 1.9 dl/g, and the polymer showed a good tendency to filament formation from the anisotropic melt.

However, the shear modulus according to DIN 53,445, at 200° C., was only 0.6% of the value measured at 20° C. under otherwise identical conditions.

The above Examples show that the novel fully aromatic polyesters have a substantially improved overall property spectrum, particularly in comparison with the products disclosed in DE-A-35 17 587.

We claim:
1. A fully aromatic thermotropic polyester based on
(A) from 30 to 60 mol % of 4-hydroxybenzoic acid,
(B) from 20 to 35 mol % of a mixture of
  (B$_1$) terephthalic acid and
  (B$_2$) isophthalic acid,
  the molar ratio of B$_1$ to B$_2$ being from 1.04:1 to 19:1, and
(C) from 20 to 35 mol % of a mixture of
  (C$_1$) hydroquinone,
  (C$_2$) 4,4'-dihydroxydiphenyl and
  (C$_3$) from 0 to 5 mol % of a dihydroxy compound of the formula I

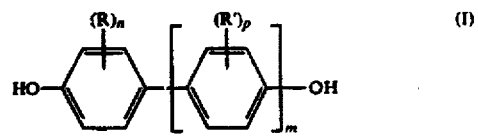

where R and R' are each alkyl of 1 to 4 carbon atoms, halogen or aryl, n and p are each 1, 2 or 3 and m is 0 or 1,
the molar ratio of C$_1$ to C$_2$ being from 0.1:1 to 2.67:1 and the molar ratio of B to C being from 0.9:1 to 1.1:1.

2. A fully aromatic thermotropic polyester as claimed in claim 1, wherein the molar ratio of components B$_1$ to B$_2$ is from 1.5:1 to 10:1.

3. A fully aromatic thermotropic polyester as claimed in claim 1, wherein the molar ratio of components C$_1$ to C$_2$ is from 0.5:1 to 2.33:1.

4. A fully aromatic thermotropic polyester as claimed in claim 1, wherein the amount of component C$_3$ is from 0.5 to 5 mol %.

5. A fully aromatic thermotropic polyester as claimed in claim 4, wherein the amount of component C$_3$ is from 1 to 4 mol %.

6. A fully aromatic thermotropic polyester as claimed in claim 1, obtainable by single-stage polycondensation of components A, B$_1$, B$_2$, C$_1$, C$_2$ and C$_3$ in the melt, in the presence of a 5–60% molar excess, based on the total content of OH groups, of an anhydride of an alkanecarboxylic acid of 2 to 6 carbon atoms.

7. A process for the preparation of a fully aromatic thermotropic polyester as claimed in claim 1 by single-stage polycondensation in the melt in the presence of an anhydride of an alkanecarboxylic acid of 2 to 6 carbon atoms, wherein components A, B$_1$, B$_2$, C$_1$, C$_2$ and C$_3$ are reacted in the presence of a 5–60% molar excess, based on the total content of OH groups, of the anhydride of the alkanecarboxylic acid.

8. A process as claimed in claim 7, wherein, after the polycondensation in the melt, the resulting product is subjected to postcondensation in the solid phase.

9. A dimensionally stable molding containing, as an essential component, a fully aromatic thermotropic polyester as claimed in claim 1 or as obtained according to claim 7.